(12) United States Patent
Kim et al.

(10) Patent No.: US 7,913,368 B2
(45) Date of Patent: Mar. 29, 2011

(54) METHOD OF MANUFACTURING CHIP CAPACITOR INCLUDING CERAMIC/POLYMER COMPOSITE

(75) Inventors: Jin Cheol Kim, Hwaseong (KR); Jun Rok Oh, Seoul (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 12/421,873

(22) Filed: Apr. 10, 2009

(65) Prior Publication Data

US 2010/0077582 A1    Apr. 1, 2010

(30) Foreign Application Priority Data

Sep. 26, 2008  (KR) ........................ 10-2008-0094859

(51) Int. Cl.
*H01R 43/00*    (2006.01)
(52) U.S. Cl. ........ 29/25.42; 29/25.03; 29/852; 361/816; 361/306.3
(58) Field of Classification Search ...... 29/25.01–25.03, 29/25.35–25.42, 830–831, 846–847, 854; 361/306.3, 308.1, 816, 818; 257/E23.174, 257/659; 174/255, 262, 264, 35 R
See application file for complete search history.

(56) References Cited

U.S. PATENT DOCUMENTS

| | | | | |
|---|---|---|---|---|
| 5,493,769 A | * | 2/1996 | Sakai et al. | 29/25.42 |
| 5,625,935 A | * | 5/1997 | Kubota et al. | 29/25.42 |
| 6,025,998 A | * | 2/2000 | Kitade et al. | 361/800 |
| 6,760,227 B2 | * | 7/2004 | Sakai et al. | 361/736 |
| 6,987,315 B2 | * | 1/2006 | Jun et al. | 257/703 |
| 2006/0198079 A1 | | 9/2006 | Shim et al. | |
| 2010/0077582 A1 | * | 4/2010 | Kim et al. | 29/25.42 |

FOREIGN PATENT DOCUMENTS

| | | |
|---|---|---|
| KR | 2006-0098771 | 9/2006 |
| KR | 10-2007-0043531 A | 4/2007 |
| KR | 10-0849791 B1 | 7/2008 |

* cited by examiner

*Primary Examiner* — Minh Trinh
(74) *Attorney, Agent, or Firm* — McDermott Will & Emery LLP

(57) ABSTRACT

A method of manufacturing a chip capacitor according to an aspect may include: preparing a capacitor lamination including a dielectric sheet formed of a composite having ceramic powder and a polymer mixed with each other, and first and second internal electrodes formed on both surfaces of the dielectric sheet at predetermined intervals; forming covering layers formed of an insulating material on both surfaces of the capacitor lamination; forming a first opening and a second opening in the capacitor lamination having the covering layers formed thereon to expose the first and second internal electrodes, respectively; forming plating layers in the first and second openings, the plating layers connected to the first and second internal electrodes; and dicing the capacitor lamination into chips on the basis of the first and second openings so that the plating layers formed in the first and second openings are provided as first and second external terminals.

9 Claims, 4 Drawing Sheets

METHOD OF MANUFACTURING CHIP CAPACITOR INCLUDING CERAMIC/POLYMER COMPOSITE

CROSS-REFERENCE TO RELATED APPLICATIONS

This application claims the priority of Korean Patent Application No. 2008-0094859 filed on Sep. 26, 2008, in the Korean Intellectual Property Office, the disclosure of which is incorporated herein by reference.

BACKGROUND OF THE INVENTION

1. Field of the Invention

The present invention relates to chip capacitors, and more particularly, to a method of manufacturing a high-frequency chip capacitor having a dielectric sheet formed of a ceramic/polymer composite.

2. Description of the Related Art

In general, as the speed and capacity of electronic apparatuses have increased, the frequency of signals transmitted along the lines of printed circuit boards has correspondingly increased. In order to transmit high-frequency signals without causing transmission loss, such as reflection loss, impedance matching between input and output terminals is of the utmost importance.

As an operating frequency increases to a high frequency, particularly, to GHz (Gigahertz), almost all the energy components of a signal between a signal line and a ground (GND) are in the form of an alternating current field. Therefore, the height or the dielectric constant of an insulating material between the signal line and the ground needs to be constant in order to minimize transmission loss such as signal reflection, due to a difference in impedance, and further, to ensure signal integrity.

As for capacitors that are used to appropriately transmit the high-frequency signals (hereinafter, simply referred to as "high-frequency capacitors"), capacitors having a small electrostatic capacity and a low-loss value are widely used.

Further, it can be said that capacitors having a small change in electrostatic capacity according to changes in temperature have very good frequency selectivity. Among multilayer ceramic capacitors (MLCCs), COG-type capacitors have these characteristics. However, as a usable frequency is higher, there is an increasing need for a capacitor that has low loss. To this end, the internal electrodes of MLCCs are formed of copper (Cu) instead of nickel (Ni) to thereby reduce loss caused by an increase in the electric conductivity of the metal.

Even though MLCCs having the internal electrode formed of the copper are advantageous in achieving low-loss capacitors, and at the same time, this composition causes a decrease in firing temperature when manufacturing capacitors. Therefore, it becomes difficult to determine an appropriate dielectric composition.

SUMMARY OF THE INVENTION

An aspect of the present invention provides a method of manufacturing a chip capacitor that can simplify the process, reduce manufacturing costs, replace existing MLCCs formed of a ceramic material, and have a low-loss value.

According to an aspect of the present invention, there is provided a method of manufacturing a chip capacitor, the method including: preparing a capacitor lamination including a dielectric sheet formed of a composite having ceramic powder and a polymer mixed with each other, and first and second internal electrodes formed on both surfaces of the dielectric sheet at predetermined intervals; forming covering layers formed of an insulating material on both surfaces of the capacitor lamination; forming at least one first opening and at least one second opening in the capacitor lamination having the covering layers formed thereon to expose the first and second internal electrodes, respectively; forming plating layers in the first and second openings, the plating layers connected to the first and second internal electrodes; and dicing the capacitor lamination into chips on the basis of the first and second openings so that the plating layers formed in the first and second openings are provided as first and second external terminals.

The dielectric sheet, the first and second internal electrodes of the capacitor lamination may include a plurality of dielectric sheets and a plurality of first and second internal electrodes, respectively, and a structure including the first and second internal electrodes with each dielectric sheet interposed therebetween may be repeated to form a lamination.

The covering layers may include metallic layers formed on outer surfaces thereof, and the method may further include selectively removing the metallic layers to electrically separate the plating layers formed in the first and second openings from each other after the forming of the plating layers.

The insulating material of the covering layers may be a composite of ceramic and a polymer the same as the dielectric sheet.

Each of the first opening and the second opening may have the shape of a slot or a hole.

Each of the first and second internal electrodes may include copper (Cu).

The ceramic powder may have a composition defined by $(1-x)BaTiO_3-xSrTiO_3$ ($0.1 \leq x \leq 0.5$), and the polymer may be a liquid crystal polymer (LCP).

The composite may have a rate of temperature change of 300 ppm/° C. or less at a measuring frequency of 1 MHz, and a dielectric factor of 0.005 or less.

The liquid crystal polymer may be in the range of 60 to 90 percent of the overall volume and the ceramic powder is in the range of 10 to 40 percent of the overall volume.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

FIGS. 1A through 1E are cross-sectional views illustrating the process flow of a method of manufacturing a chip capacitor according to an exemplary embodiment of the invention.

Figure 1A:
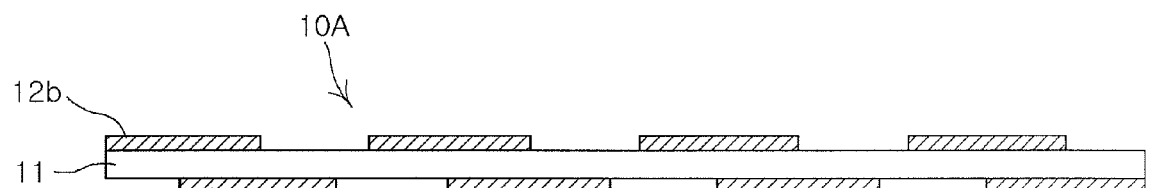
FIGS. 1A through 1E are cross-sectional views illustrating the process flow of a method of manufacturing a chip capacitor according to an exemplary embodiment of the present invention.

As shown in FIG. 1A, a capacitor lamination 10A is prepared. The capacitor lamination 10A has a dielectric sheet 11 and first and second internal electrodes 12a and 12b that are formed on both sides of the dielectric sheet 11 at predetermined intervals.

The dielectric sheet 11, which is used in this embodiment of the invention, is formed of a composite having ceramic powder and a polymer mixed together. The ceramic/polymer composite has a relatively low dielectric constant. However, since a high-frequency capacitor does not require a high dielectric constant, the ceramic/polymer composite can be advantageously used as long as it satisfies loss characteristics.

Preferably, the ceramic powder may have a composition defined by the formula $(1-x)BaTiO_3-xSrTiO_3$ $(0.1 \leq x \leq 0.5)$, and the polymer may be a liquid crystal polymer (LCP), which is a high heat resistant thermoplastic resin. Here, the composite has a rate of temperature change of 300 ppm/° C. or less at a measuring frequency of 1 MHz, and a dielectric factor of 0.005 or less. Preferably, a composite may include a mixture of the liquid crystal polymer within the range of 60 to 90 percent of the overall volume and the ceramic within the range of 10 to 40 percent of the overall volume.

The first and second internal electrodes 12a and 12b are arranged with the dielectric sheet 11 interposed therebetween, and partially overlap each other. The overlaps therebetween are provided as an activation area that defines the capacity of the capacitor. Further, as shown in FIG. 1A, the first and second internal electrodes 12a and 12b slightly cross each other to facilitate the subsequent process of forming an external terminal.

The ceramic/polymer composite used in this embodiment of the invention does not require a high-temperature firing process unlike an existing method of manufacturing MLCCs including ceramic material. Therefore, copper (Cu), having high electrical conductivity, can be used to form the internal electrodes 12a and 12b.

Figure 1B:
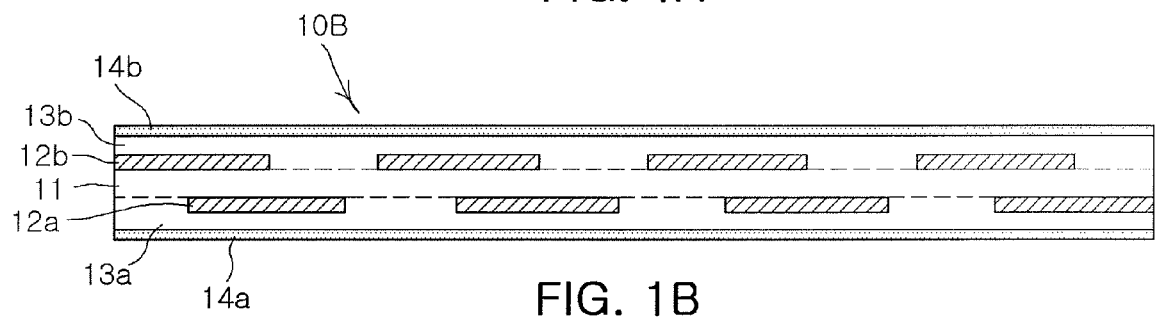

Then, as shown in FIG. 1B, covering layers 13a and 13b are formed on both surfaces of the capacitor lamination 10A.

Metallic layers 14a and 14b may be formed on outer surfaces of the covering layers 13a and 13b, respectively, in this process. The metallic layers 14a and 14b are located on the outermost edges of the capacitor lamination 10A to realize a plating process to form an external terminal.

An insulating material of the covering layers 13a and 13b is not limited thereto, but may be a composite including a ceramic/polymer mixture the same as the dielectric sheet 11. The covering layers 13a and 13b may be formed using a v-press process.

Figure 1C:
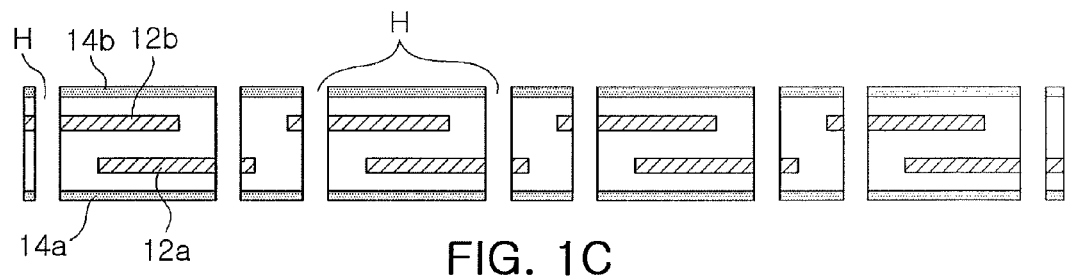

As shown in FIG. 1C, at least one first opening H and at least one second opening H are formed in the capacitor lamination 10B having the covering layers 13a and 13b thereon, thereby forming external terminals on the capacitor lamination 10B.

The first and second internal electrodes 12a and 12b are respectively exposed through the first and second openings H, formed in this process. Each of the first and second openings H may have various shapes, such as a slot or a hole, according to the shape of a necessary external terminal. The first and second openings H are formed between both side surfaces that face each other in a final chip capacitor.

Figure 2A:
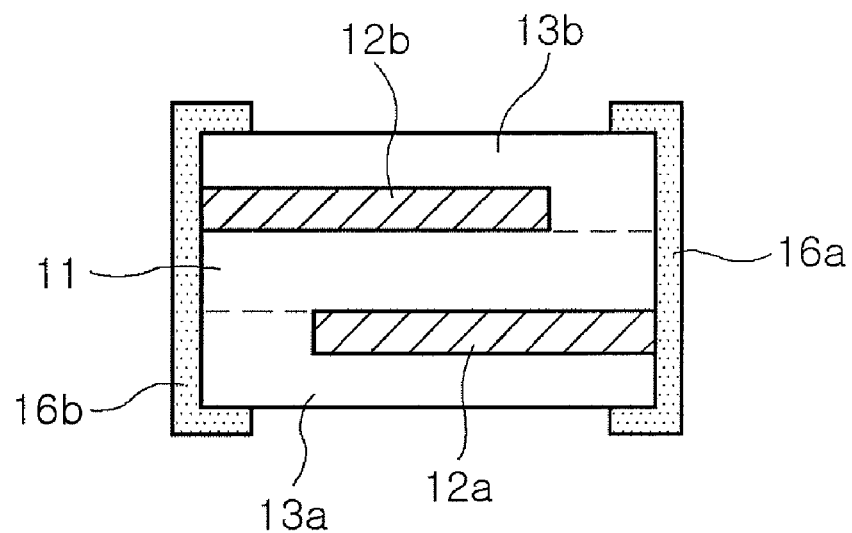
FIG. 2A is a side cross-sectional view illustrating a chip capacitor manufactured by a method according to an exemplary embodiment of the present invention.
Figure 2B:
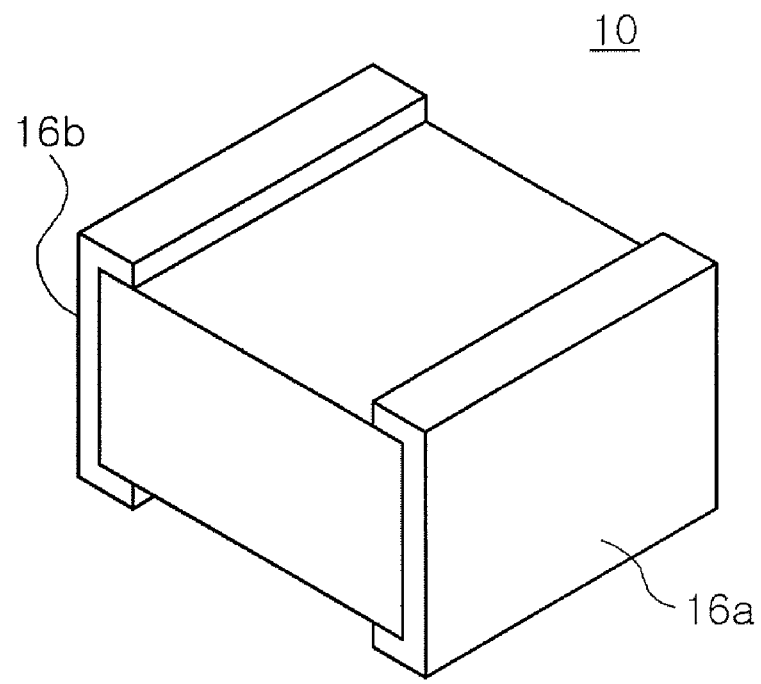
FIG. 2B is a schematic perspective view illustrating the chip capacitor manufactured by the method according to the embodiment, illustrated in FIG. 2A.
Figure 3:
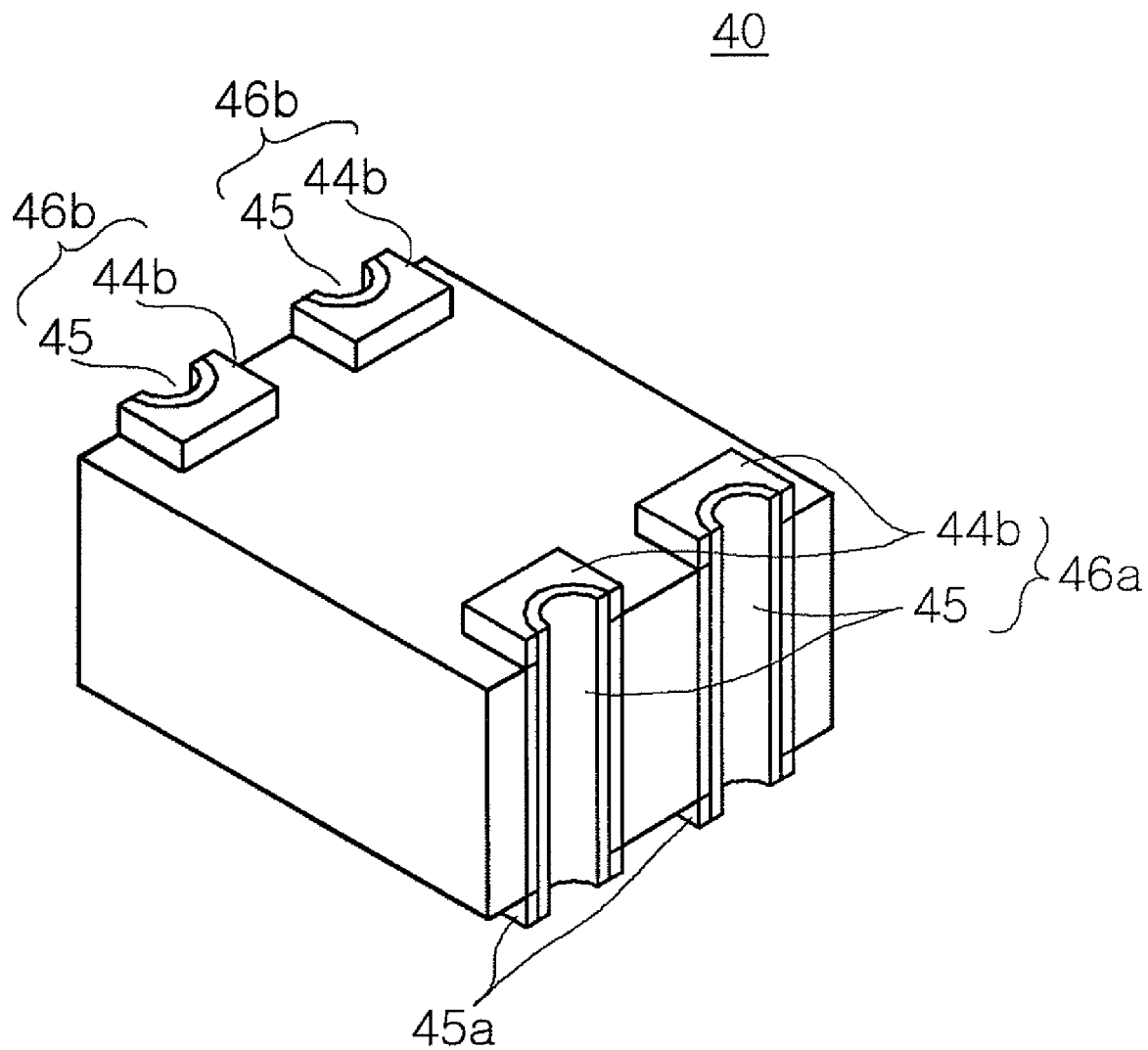
FIG. 3 is a schematic perspective view illustrating a chip capacitor manufactured by a method according to another exemplary embodiment of the present invention.

Two openings having the shape of a slot are formed in both sides of the chip capacitor 10 as shown in FIG. 2B, and external terminals 16a and 16b are respectively formed in the two openings. Two openings having the shape of a hole are formed in either side of a chip capacitor 40 as shown in FIG. 3, and external terminals 46a and 46b are respectively formed in the two openings.

Figure 1D:
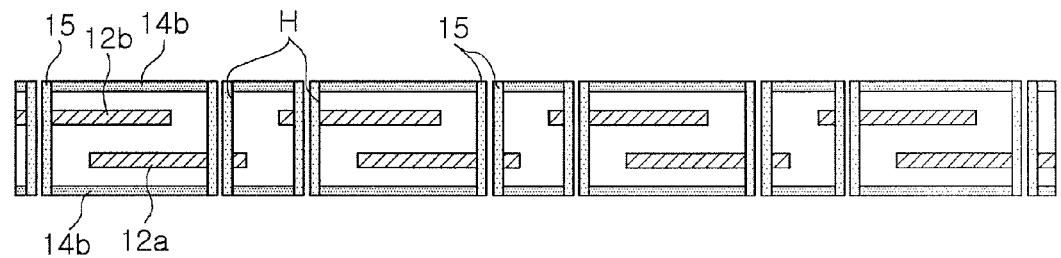

Then, as shown in FIG. 1D, plating layers 15 that are connected to the first and second internal electrodes 12a and 12b are formed along the first and second openings H.

The plating layer 15, formed in the first opening H, is connected to the first internal electrode 12a and insulated from the second internal electrode 12b. The plating layer 15, formed in the second opening H, is connected to the second internal electrode 12b and insulated from the first internal electrode 12a.

As described above, this plating process can be easily performed using the metallic layers 14a and 14b that are formed on the covering layers 13a and 13b located on the outermost edges.

Figure 1E:
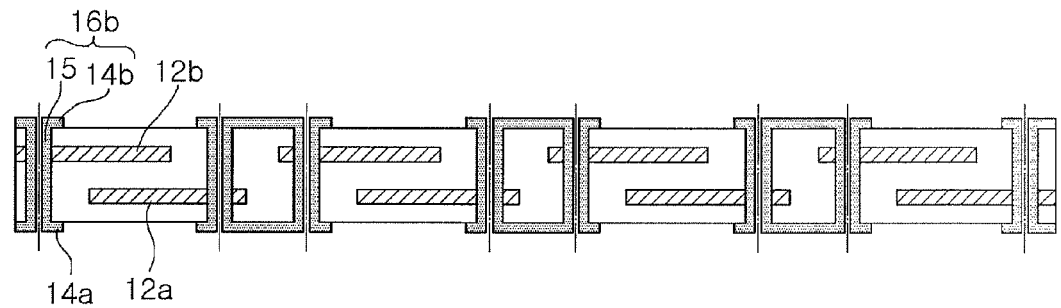

Then, as shown in FIG. 1E, the metallic layers 14a and 14b are selectively removed so that the plating layers 15, formed in the first and second openings H, can be electrically separated from each other.

Then, the result is diced into chips on the basis of the first and second openings H. As described above, the plating layers 15, formed in the first and second openings H, and the remaining metallic layers 14a and 14b are provided as first and second external terminals 16a and 16b, respectively.

As such, the chip capacitor obtained by dicing the result into individual chips is shown in FIGS. 2A and 2B. As shown in FIG. 2A, the first and second internal electrodes 12a and 12b are arranged with the dielectric sheet 11 interposed therebetween. The first and second internal electrodes 12a and 12b are connected to the first and second external terminals 16a and 16b, respectively. As a result, a chip capacitor that has a similar structure to an MLCC in the related art can be provided.

FIG. 3 is a schematic perspective view illustrating a chip capacitor manufactured according to another exemplary embodiment of the invention.

It can be understood that the chip capacitor 40, shown in FIG. 3, is also manufactured using a similar process to the process illustrated in FIGS. 1A to 1E. Two openings, shown in FIG. 1C, having the shape of a hole are formed in each of the sides of the chip capacitor 40. Plating layer 45, formed in the openings, and metallic layers 44a and 44b, formed on upper and lower surfaces of the main body, are provided as external terminals 46a and 46b, respectively.

In this embodiment, the capacitor lamination has one dielectric sheet and first and second internal electrodes formed on both sides of the single dielectric sheet. However, the capacitor lamination may have a plurality of dielectric sheets, and first and second internal electrodes alternating with each other such that the first and second internal electrodes oppose each other while interposing a dielectric sheet. This also falls within the scope of the invention.

A chip capacitor, which is manufactured using a manufacturing method according to an embodiment of the invention, can be usefully used as a high-frequency capacitor. Since a high-temperature firing process is not required by forming a dielectric sheet including a ceramic-polymer composite, the internal electrodes can be formed of copper, having a high electrical conductivity. Further, in order to manufacture higher quality high-frequency capacitors, this invention provides desirable conditions affecting the composition of the ceramic-polymer composite.

The ceramic powder may preferably be formed of a BST-based ceramic filler that has low-loss characteristics and causes a small change in the dielectric constant according to temperature, that is, a ceramic filler having a composition defined by the formula $(1-x)BaTiO_3\text{-}xSrTiO_3$ ($0.1 \leq x \leq 0.5$). The polymer may preferably be formed of a liquid crystal polymer (LCP) that is high heat resistant thermoplastic resin. The liquid crystal polymer may include aromatic liquid crystal polyester.

A dielectric sheet is manufactured by dispersing the BST-based ceramic filler into the aromatic liquid crystal polyester. Specifically, various samples have been manufactured under the condition that as a ceramic filler having a composition defined by the formula $(1-x)BaTiO_3\text{-}xSrTiO_3$ ($0.1 \leq x \leq 0.5$) is used while x (molar ratio of Sr) is 0.1, 0.2, 0.3, 0.4 or 0.5, and the ceramic filler has a volume ratio of 30% or 50%.

First, the dielectric constant and the Q value of each of the samples were measured and shown in Table 1. Also, the ratio of change in the dielectric constant of each sample was measured and shown in graph of FIG. 4.

TABLE 1

| Molar ratio of Sr (x) | Volume ratio of ceramic filler: 30% | | Volume ratio of ceramic filler: 50% | |
|---|---|---|---|---|
| | Dielectric constant | Q value | Dielectric constant | Q value |
| 0.1 (BST1) | 10.2 | 183 | 28.5 | 142 |
| 0.2 (BST2) | 10.4 | 306 | 27.4 | 206 |
| 0.3 (BST3) | 9.6 | 248 | 27.1 | 239 |
| 0.4 (BST4) | 9.8 | 289 | 26.9 | 300 |
| 0.5 (BST5) | 10.2 | 752 | 28.3 | 345 |

As shown in Table 1, all of the samples have high Q values, and the dielectric ratio is likely to increase according to the volume ratio of the ceramic filler. Therefore, as for a high-frequency chip capacitor having a low dielectric constant, the liquid crystal polymer is in the range of 60 to 90 percent of the overall volume, and the ceramic is in the range of 10 to 40 percent of the overall volume.

Figure 4:
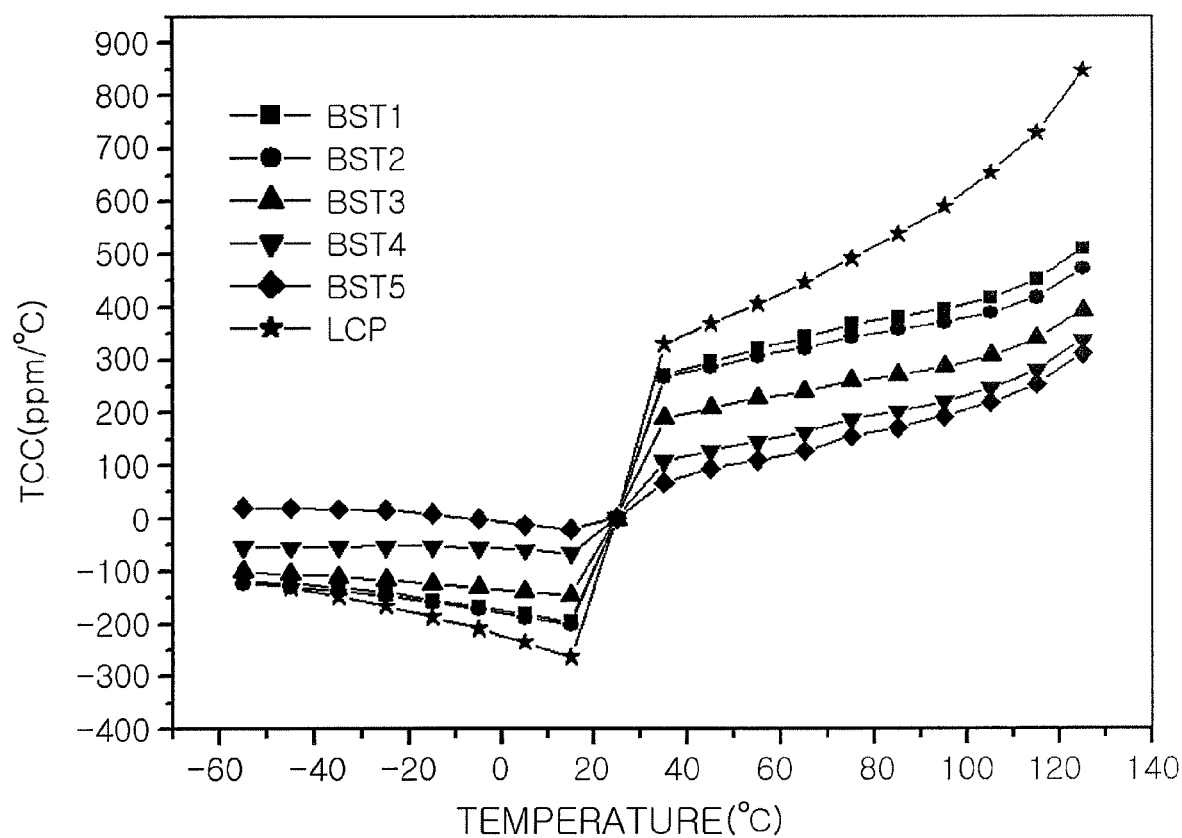
FIG. 4 is a graph illustrating changes in the dielectric constant of a composite of a dielectric material and a polymer (LCP) according to temperature.

Further, as shown in the graph of FIG. 4, the samples were shown to have a rate of temperature change of 300 ppm/° C. or less at a measuring frequency of 1 MHz, and a dielectric factor of 0.005 or less to obtain an excellent high-frequency capacitor.

As set forth above, according to exemplary embodiments of the invention, a high-frequency chip capacitor can simplify the process and significantly reduce manufacturing costs by forming a dielectric sheet using a composite of ceramic powder and a polymer, and manufacturing a chip capacitor including the dielectric sheet that has a similar structure to an MLCC, the high-frequency chip capacitor having a low-loss value by appropriately selecting a composite. Particularly, since the high-frequency capacitor does not require a firing process unlike the existing MLCC including a ceramic material, an internal electrode can be formed of copper (Cu) having high electrical conductivity, thereby remarkably improving loss characteristics.

While the present invention has been shown and described in connection with the exemplary embodiments, it will be apparent to those skilled in the art that modifications and variations can be made without departing from the spirit and scope of the invention as defined by the appended claims.

What is claimed is:

1. A method of manufacturing a chip capacitor, the method comprising:
   preparing a capacitor lamination including a dielectric sheet formed of a composite having ceramic powder and a polymer mixed with each other, and first and second internal electrodes formed on both surfaces of the dielectric sheet at predetermined intervals;
   forming covering layers formed of an insulating material on both surfaces of the capacitor lamination;
   forming at least one first opening and at least one second opening in the capacitor lamination having the covering layers formed thereon to expose the first and second internal electrodes, respectively;
   forming plating layers in the first and second openings, the plating layers connected to the first and second internal electrodes; and
   dicing the capacitor lamination into chips on the basis of the first and second openings so that the plating layers formed in the first and second openings are provided as first and second external terminals.

2. The method of claim 1, wherein the dielectric sheet, the first and second internal electrodes of the capacitor lamination comprise a plurality of dielectric sheets and a plurality of first and second internal electrodes, respectively, and the plurality of first and second internal electrodes alternate with each other such that the first and second internal electrodes oppose each other while interposing a dielectric sheet.

3. The method of claim 1, wherein the covering layers include metallic layers formed on outer surfaces thereof, and
   the method further comprises selectively removing the metallic layers to electrically separate the plating layers formed in the first and second openings from each other after the forming of the plating layers.

4. The method of claim 1, wherein the insulating material of the covering layers is a composite of ceramic and a polymer the same as the dielectric sheet.

5. The method of claim 1, wherein each of the first opening and the second opening has the shape of a slot or a hole.

6. The method of claim 1, wherein each of the first and second internal electrodes comprises copper.

7. The method of claim 1, wherein the ceramic powder has a composition by the formula defined by $(1-x)BaTiO_3\text{-}xSrTiO_3$ ($0.1 \leq x \leq 0.5$), and the polymer is a liquid crystal polymer.

8. The method of claim 7, wherein the composite has a rate of temperature change of 300 ppm/° C. or less at a measuring frequency of 1 MHz, and a dielectric factor of 0.005 or less.

9. The method of claim 8, wherein the liquid crystal polymer may be in the range of 60 to 90 percent of the overall volume and the ceramic powder is in the range of 10 to 40 percent of the overall volume.

* * * * *